US009122368B2

(12) United States Patent      (10) Patent No.: US 9,122,368 B2
Szeliski et al.      (45) Date of Patent: Sep. 1, 2015

(54) ANALYSIS OF IMAGES LOCATED WITHIN THREE-DIMENSIONAL ENVIRONMENTS

(75) Inventors: Richard S. Szeliski, Bellevue, WA (US); Blaise H. Aguera y Arcas, Seattle, WA (US); Tomasz S. M. Kasperkiewicz, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 317 days.

(21) Appl. No.: 12/722,280

(22) Filed: Mar. 11, 2010

(65) Prior Publication Data

US 2010/0169838 A1    Jul. 1, 2010

Related U.S. Application Data

(63) Continuation of application No. 11/461,315, filed on Jul. 31, 2006, now Pat. No. 7,712,052.

(51) Int. Cl.
  *G06F 17/00*     (2006.01)
  *G06F 3/0481*    (2013.01)
  *G06F 17/30*    (2006.01)
  *G06T 19/00*    (2011.01)

(52) U.S. Cl.
  CPC ...... *G06F 3/04815* (2013.01); *G06F 17/30274* (2013.01); *G06T 19/003* (2013.01)

(58) Field of Classification Search
  CPC .......... G06T 17/05; G06T 19/00; G06T 17/00
  USPC .................................. 345/419; 715/205, 854
  See application file for complete search history.

(56) References Cited

U.S. PATENT DOCUMENTS

| | | | |
|---|---|---|---|
| 3,748,644 A | 7/1973 | Tisdale | |
| 4,891,750 A | 1/1990 | Pastor et al. | |
| 4,953,227 A | 8/1990 | Katsuma et al. | |
| 4,996,994 A | 3/1991 | Steinhauer et al. | |
| 5,452,416 A * | 9/1995 | Hilton et al. | 715/783 |
| 5,579,471 A | 11/1996 | Barber et al. | |
| 5,781,195 A | 7/1998 | Marvin | |
| 5,805,118 A * | 9/1998 | Mishra et al. | 345/1.1 |

(Continued)

FOREIGN PATENT DOCUMENTS

| | | |
|---|---|---|
| JP | 2002032761 | 1/2002 |
| KR | 1020000039600 | 7/2000 |
| KR | 1020010001694 | 1/2001 |

OTHER PUBLICATIONS

International Search Report with Written Opinion dated Jan. 8, 2008 in Application No. PCT/US2007/017012, 11 pages.

(Continued)

*Primary Examiner* — Stephen Hong
*Assistant Examiner* — Marshon Robinson
(74) *Attorney, Agent, or Firm* — Steven Spellman; Jim Ross; Micky Minhas

(57) ABSTRACT

Images are analyzed within a 3D environment that is generated based on spatial relationships of the images and that allows users to experience the images in the 3D environment. Image analysis may include ranking images based on user viewing information, such as the number of users who have viewed an image and how long an image was viewed. Image analysis may further include analyzing the spatial density of images within a 3D environment to determine points of user interest.

20 Claims, 5 Drawing Sheets

(56) References Cited

U.S. PATENT DOCUMENTS

| | | | |
|---|---|---|---|
| 5,838,320 A * | 11/1998 | Matthews, III et al. | 715/786 |
| 5,940,079 A | 8/1999 | Morino et al. | |
| 6,031,989 A * | 2/2000 | Cordell | 717/109 |
| 6,121,969 A * | 9/2000 | Jain et al. | 715/850 |
| 6,154,567 A | 11/2000 | McGarry et al. | |
| 6,229,546 B1 * | 5/2001 | Lancaster et al. | 345/419 |
| 6,272,501 B1 | 8/2001 | Baumann et al. | |
| 6,281,903 B1 | 8/2001 | Martin et al. | |
| 6,317,139 B1 | 11/2001 | Williams | |
| 6,377,713 B1 | 4/2002 | Vuong | |
| 6,453,064 B1 | 9/2002 | Aikawa et al. | |
| 6,486,908 B1 | 11/2002 | Chen et al. | |
| 6,487,554 B2 | 11/2002 | Ganapathy et al. | |
| 6,522,782 B2 | 2/2003 | Pass et al. | |
| 6,542,201 B1 | 4/2003 | Song et al. | |
| 6,556,196 B1 | 4/2003 | Blanz et al. | |
| 6,556,998 B1 | 4/2003 | Mukherjee et al. | |
| 6,591,011 B1 | 7/2003 | Nielsen | |
| 6,611,268 B1 | 8/2003 | Szeliski et al. | |
| 6,628,824 B1 | 9/2003 | Belanger | |
| 6,629,097 B1 * | 9/2003 | Keith | 1/1 |
| 6,708,183 B1 | 3/2004 | Mori et al. | |
| 6,718,075 B1 | 4/2004 | Yamamoto | |
| 6,724,407 B1 * | 4/2004 | Cheng | 715/848 |
| 6,751,363 B1 | 6/2004 | Natsev et al. | |
| 6,791,530 B2 | 9/2004 | Vernier et al. | |
| 6,792,134 B2 | 9/2004 | Chen et al. | |
| 6,819,785 B1 | 11/2004 | Vining et al. | |
| 6,859,802 B1 | 2/2005 | Rui | |
| 6,963,666 B2 | 11/2005 | Abe | |
| 7,031,555 B2 | 4/2006 | Troyanker | |
| 7,032,182 B2 | 4/2006 | Prabhu et al. | |
| 7,062,722 B1 * | 6/2006 | Carlin et al. | 715/850 |
| 7,065,248 B2 | 6/2006 | Lee et al. | |
| 7,080,127 B1 | 7/2006 | Hickman et al. | |
| 7,161,616 B1 | 1/2007 | Okamoto et al. | |
| 7,298,378 B1 * | 11/2007 | Hagenbuch et al. | 345/589 |
| 7,307,636 B2 * | 12/2007 | Matraszek et al. | 345/581 |
| 7,324,115 B2 | 1/2008 | Fraser | |
| 7,350,236 B1 * | 3/2008 | Silverbrook et al. | 726/26 |
| 7,397,971 B2 | 7/2008 | Oka | |
| 7,454,090 B2 * | 11/2008 | Wilcock et al. | 382/305 |
| 7,460,130 B2 | 12/2008 | Salganicoff | |
| 7,523,411 B2 * | 4/2009 | Carlin | 715/782 |
| 7,697,754 B2 | 4/2010 | Park et al. | |
| 2001/0056415 A1 | 12/2001 | Zhu et al. | |
| 2002/0006221 A1 | 1/2002 | Shin et al. | |
| 2002/0047870 A1 * | 4/2002 | Carro | 345/855 |
| 2002/0049786 A1 * | 4/2002 | Bibliowicz et al. | 707/511 |
| 2002/0054059 A1 * | 5/2002 | Schneiderman | 345/700 |
| 2002/0070981 A1 * | 6/2002 | Kida | 345/833 |
| 2002/0080168 A1 * | 6/2002 | Hilliard et al. | 345/744 |
| 2002/0097894 A1 * | 7/2002 | Staas et al. | 382/113 |
| 2002/0122073 A1 * | 9/2002 | Abrams et al. | 345/838 |
| 2002/0129058 A1 * | 9/2002 | Story et al. | 707/513 |
| 2002/0154174 A1 | 10/2002 | Redlich et al. | |
| 2003/0011676 A1 * | 1/2003 | Hunter et al. | 348/119 |
| 2003/0072486 A1 * | 4/2003 | Loui et al. | 382/175 |
| 2003/0081010 A1 * | 5/2003 | An Chang et al. | 345/835 |
| 2003/0106724 A1 * | 6/2003 | Masamitsu et al. | 178/18.03 |
| 2003/0110163 A1 | 6/2003 | Chen et al. | |
| 2003/0122839 A1 * | 7/2003 | Matraszek et al. | 345/581 |
| 2003/0123737 A1 | 7/2003 | Mojsilovic | |
| 2003/0149939 A1 * | 8/2003 | Hubel et al. | 715/526 |
| 2003/0193528 A1 * | 10/2003 | Stegbauer et al. | 345/853 |
| 2003/0212692 A1 | 11/2003 | Campos et al. | |
| 2004/0024738 A1 | 2/2004 | Yamane | |
| 2004/0080541 A1 | 4/2004 | Saiga et al. | |
| 2004/0150638 A1 | 8/2004 | Ikeuchi et al. | |
| 2004/0205498 A1 * | 10/2004 | Miller | 715/501.1 |
| 2004/0210845 A1 * | 10/2004 | Paul et al. | 715/731 |
| 2004/0217884 A1 | 11/2004 | Samadani et al. | |
| 2004/0220957 A1 | 11/2004 | McDonough | |
| 2004/0225635 A1 * | 11/2004 | Toyama et al. | 707/1 |
| 2004/0250205 A1 * | 12/2004 | Conning | 715/517 |
| 2005/0086612 A1 * | 4/2005 | Gettman et al. | 715/848 |
| 2005/0091193 A1 | 4/2005 | Frank et al. | |
| 2005/0102309 A1 | 5/2005 | Tully | |
| 2005/0108234 A1 | 5/2005 | Oksanen et al. | |
| 2005/0108261 A1 | 5/2005 | Glassy | |
| 2005/0138564 A1 * | 6/2005 | Fogg | 715/745 |
| 2005/0165541 A1 * | 7/2005 | Noguchi et al. | 701/200 |
| 2005/0165795 A1 | 7/2005 | Myka et al. | |
| 2005/0188328 A1 * | 8/2005 | Sezan et al. | 715/789 |
| 2005/0203931 A1 | 9/2005 | Pingree et al. | |
| 2005/0206657 A1 | 9/2005 | Arcas | |
| 2005/0262049 A1 | 11/2005 | Somppi | |
| 2005/0262073 A1 | 11/2005 | Reed et al. | |
| 2005/0283490 A1 | 12/2005 | Kaneko et al. | |
| 2006/0023066 A1 | 2/2006 | Li et al. | |
| 2006/0036949 A1 * | 2/2006 | Moore et al. | 715/730 |
| 2006/0041564 A1 | 2/2006 | Jain | |
| 2006/0074771 A1 * | 4/2006 | Kim et al. | 705/26 |
| 2006/0080342 A1 | 4/2006 | Takaki | |
| 2006/0085442 A1 | 4/2006 | Fujiwara | |
| 2006/0101005 A1 | 5/2006 | Yang et al. | |
| 2006/0117040 A1 | 6/2006 | Begeja et al. | |
| 2006/0153469 A1 | 7/2006 | Gallagher | |
| 2006/0155684 A1 | 7/2006 | Liu et al. | |
| 2006/0280427 A1 | 12/2006 | Snowdon et al. | |
| 2007/0065002 A1 * | 3/2007 | Marzell et al. | 382/154 |
| 2007/0110338 A1 | 5/2007 | Snavely et al. | |
| 2007/0120856 A1 | 5/2007 | De Ruyter et al. | |
| 2007/0230824 A1 | 10/2007 | Alvarez | |

OTHER PUBLICATIONS

Snavely et al., "Photo Tourism: Exploring Photo Collections in 3D," ACM Transactions on Graphics, 25(3), Aug. 2006.

Frese et al., "A Methodology for Designing Image Similarity Metrics Based on Human Visual System Models," Proc. of SPIE/IS&T Conf. on Human Vision and Electronic Imaging II, vol. 3016, pp. 472-483, San Jose, CA, Feb. 10-13, 1997.

Rodden et al., "Does Organisation by Similarity Assist Image Browsing?" Proc. of SIGCHI Conference on Human Factors in Computing Systems, pp. 190-197, Seattle, WA, Apr. 2001.

Graham et al., "Time as Essence for Photo Browsing Through Personal Digital Libraries," Proceedings of the 2nd ACM/IEEE-CS Joint Conference on Digital Libraries, Jul. 14-18, 2002, Portland, Oregon, USA.

D. Lowe, "Distinctive Image Features from Scale-Invariant Keypoints," International Journal of Computer Vision 60, 2, pp. 91-110 (2004).

Kentaro Toyama; "Geographic Location tags on digital images"; 2003; ACM; pp. 156-166.

R. Perko, "Computer Vision For Large Format Digital Aerial Cameras", Date: Oct. 2004, http://vicos.fri.uni-lj.si/roli/publications/perko04dissertation_web.pdf.

S. Hsu et al, "Automated Mosaics via Topology Inference", Date: Apr. 2002, http://ieeexplore.ieee.org/iel5/38/21293/00988746.pdf?isNumber=&htry=1.

Sing Bing Kang, "A Survey of Image-based Rendering Techniques", Date: Aug. 1997, http://www.hpl.hp.com/techreports/Compaq-DEC/CRL-97-4.pdf.

\* cited by examiner

ANALYSIS OF IMAGES LOCATED WITHIN THREE-DIMENSIONAL ENVIRONMENTS

CROSS-REFERENCE TO RELATED APPLICATIONS

This application is a continuation of U.S. patent application Ser. No. 11/461,315, filed Jul. 31, 2006, the entire disclosure of which is hereby incorporated by reference.

BACKGROUND

Over the past decade, the popularity of digital photography has continued to grow exponentially as digital cameras have become widespread, whether as stand alone devices or integrated with other devices, such as camera phones. At the same time, technology developments have made it easier to share photographs, for example, by emailing digital photographs, posting digital photographs on personal webpages, or posting digital photographs on photo-sharing websites. As a result, individuals now have access to millions of photographs. While the general availability of photographs provides exciting opportunities, it is difficult for users to sort through such vast numbers of images. Current approaches for searching through images, such as tagging images with keywords, often does not provide a satisfactory user experience. Additionally, current approaches for photograph sharing are fairly dry. Photographs may be sent to a person (e.g., via email) or a site (e.g., a personal webpage or photo-sharing website) and viewed. It is currently possible for users to create more immersive experiences, such as by using tools to create slideshows of images. However, the result still tends to be linear (i.e., progression from one image to another) and in large files that are hard to share.

Fairly recently, a technique has been proposed for generating three-dimensional (3D) environments from two-dimensional (2D) images, such as photographs, and for positioning each of the photographs within the 3D environment. The resulting 3D environment may then be navigated, allowing users to view a collection of images using the 3D environment to provide spatial context. While this technique provides a more immersive user experience, the size of a particular 3D environment may make it difficult to share. Additionally, the 3D environment may become cluttered if an excessive number of images are included.

BRIEF SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to applications that extend the basic concept of determining spatial relationships between images and generating a model allowing users to experience the images in a 3D environment. Some embodiments relate to ranking images based on user viewing information, such as the number of users who have viewed an image and how long an image was viewed. Other embodiments are directed to analyzing the spatial density of images within a 3D environment.

BRIEF DESCRIPTION OF THE SEVERAL VIEWS OF THE DRAWING

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide applications that expand on the basic concept of using a collection of images to generate a 3D environment in which the images are positioned based on spatial information associated with each image.

Exemplary Operating Environment

Figure 1:
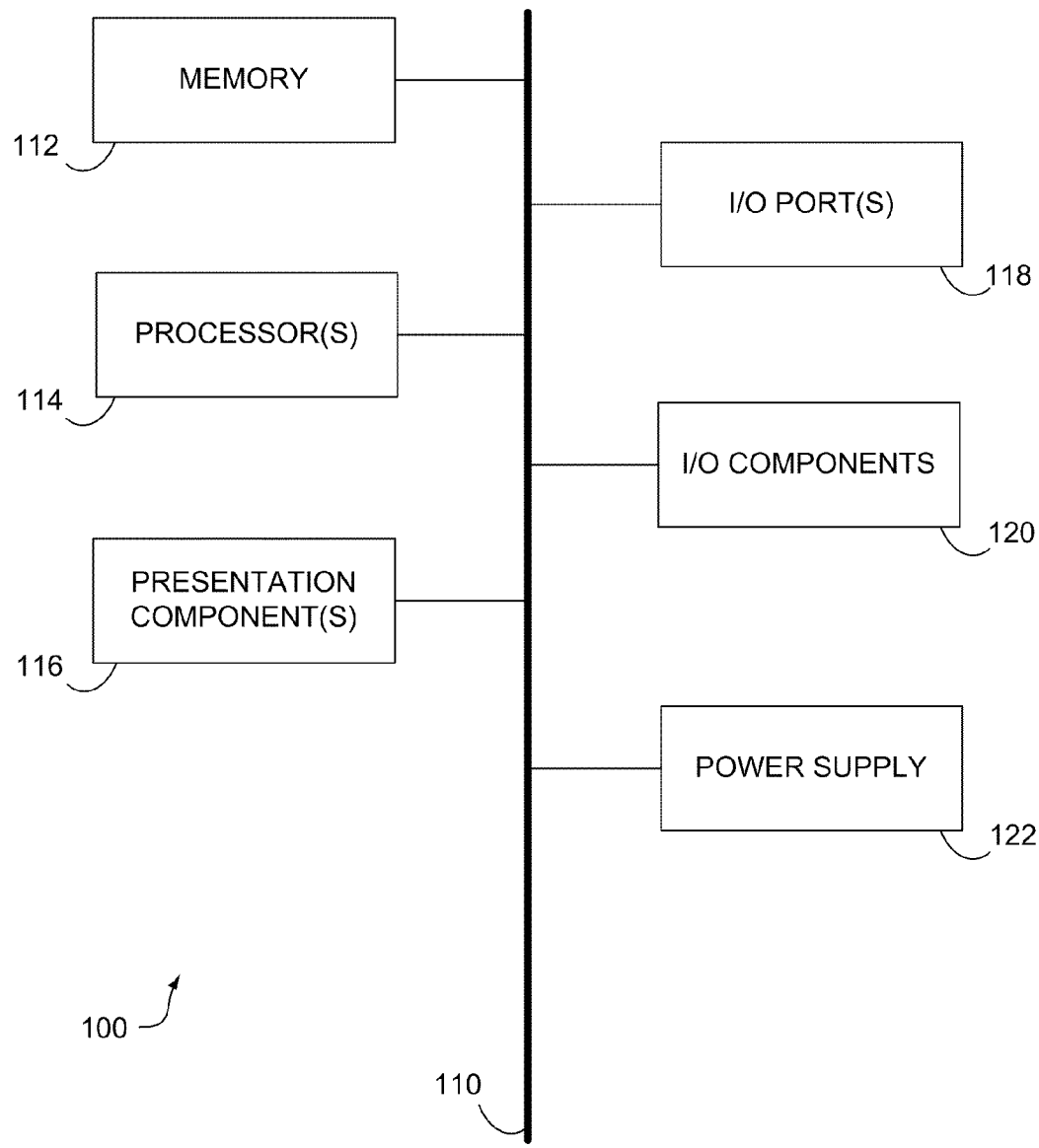
FIG. 1 is a block diagram of an exemplary computing environment suitable for use in implementing the present invention.

Having briefly described an overview of the present invention, an exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Computing device 100 includes a bus 110 that directly or indirectly couples the following devices: memory 112, one or more processors 114, one or more presentation components 116, input/output (I/O) ports 118, I/I components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode and store desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Generation of 3-Dimensional Environments from Images

Embodiments of the present invention build upon the underlying technique of building three-dimensional environments (3D) from two-dimensional (2D) digital images. Generally, the technique uses a collection of photographs located in a geographically contiguous area (e.g., a famous tourist site). These photographs may be a user's personal photographs or may be obtained for a variety of sources, such as photo-sharing sites. The technique matches the photographs, estimates the relative 3D positions of the photographs, and constructs a model of the 3D environment. The complexity of the model may vary in different embodiments and may range from a sparse (point cloud) model to a complete 3D texture-mapped model. The photographs are positioned within the 3D environment based on the spatial information derived for each of the photographs. A user may navigate through the 3D environment and the photographs. Navigating from photograph to photograph maintains the full realism of each photograph, and uses the 3D model principally to organize the photographs spatially and create transitions between them that preserve their geometric relationships.

Figure 2A:
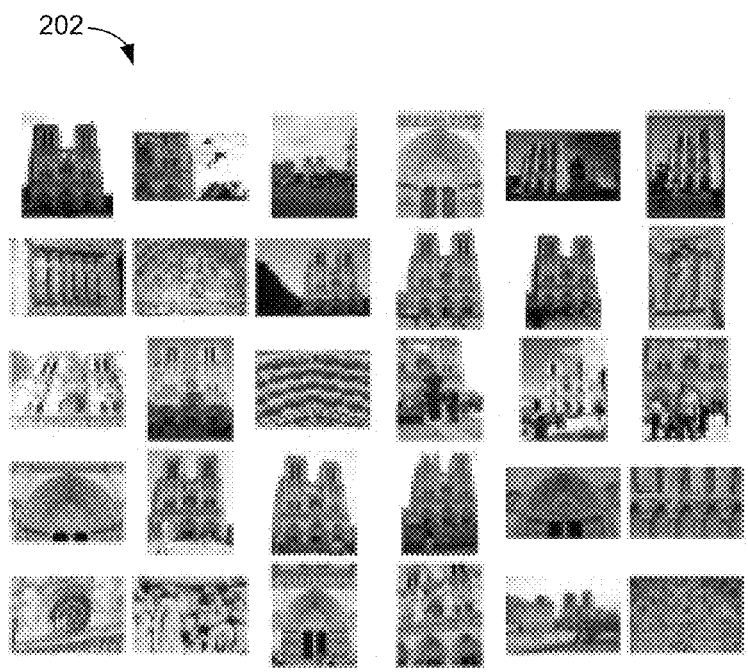
FIGS. 2A and 2B illustrate a collection of photographs and a 3D environment generated from the photographs, respectively.
Figure 2B:
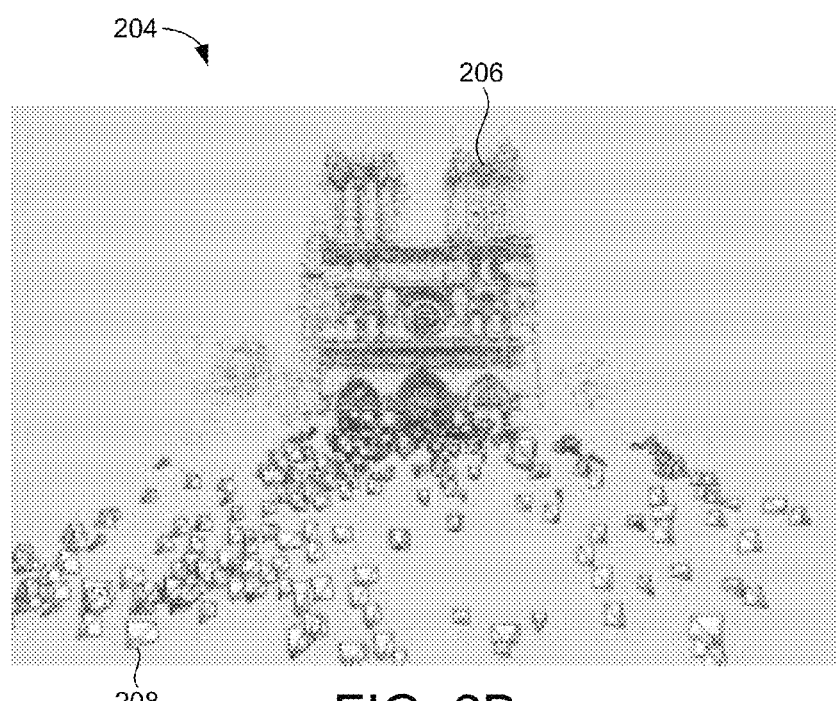

An example of a 3D environment created using the above-described technique is illustrated in FIG. 2B. In particular, a collection of photographs 202 of the Notre Dame cathedral in Paris, such as those shown in FIG. 2A, were used to generate the 3D environment 204 shown in FIG. 2B. The technique determined the 3D locations of the images within the collection and generated a sparse 3D model 206, which comprises a point cloud model of the scene, as shown in FIG. 2B. The images are shown as frusta (e.g., frustum 208) within the 3D environment and are located based on their respective 3D locations.

It should be noted that although photographs are most likely the primary images that may be used to create and/or are included in such 3D environments, a variety of other 2D images may also be employed. For example, video images may be included by taking one or more frames of the video and positioning the video within the 3D environment based on spatial information associated with the frames. Additionally, artwork images, such as paintings or sketches, may also be similarly positioned in the 3D environment. As indicated above, the images may be collected from a variety of different sources within the scope of the present invention, such as, for example: a user's personal collection; photo-sharing sites; images located within webpages; and live (real-time or near real-time) feeds from cell phones and web-cams.

While the above-described technique provides a rich way to experience photographs in a natural 3D setting, the implications of this work are much wider reaching. A wide variety of applications are enabled and discussed in detail in the following sections.

Document Creation, Editing, Viewing and Sharing

Although the generation of 3D environments as described hereinabove provides a rich user experience by allowing users to view 2D images, such as photographs, within a 3D scene that organizes the images spatially, the user experience could be further enhanced. In particular, the availability of images from different sources allows for the generation of 3D environments for a large collection of images. As a result, the 3D environment may be difficult to share between users. Additionally, a large number of images may cause the scene to be cluttered, detracting from the user experience. Further, users may want to provide a more structured experience than that provided by general navigation tools that allow users to freely navigate the 3D environment. For example, users may wish to use the environment to tell stories, give tours, or otherwise provide a more structured way of viewing.

Accordingly, in an embodiment of the present invention, users may create documents that may be readily shared, viewed, and edited. Instead of containing the content itself, the document includes references to underlying content, which includes a 3D environment with images positioned therein. The references may include only a subset of the images within the 3D environment. Additionally, the document defines connections between the images. The connections between images represent a path or set of paths through the 3D environment and images. In one embodiment, this may be a linear path through the 3D environment from a starting point to an ending point. In another embodiment, this may be multiple paths with decision points connecting the various paths, creating a grid-like environment that may be traversed by a viewer. The connections between images are primarily spatial, but may also be based on other dimensions, such as subject, contents, time, and author. Additionally, the connections may be created automatically by the system using some heuristics, or can be authored manually by a user.

In addition to connections between images that represent paths through a 3D environment, the document may include links to other types of content, such as annotations, audio narration, and ambient audio. In some cases, these other content types may be associated directly with a particular image. For example, an audio narration describing an object in an image may be linked to that image. In other cases, these other content types may be associated with connections between images or may simply exist in the document. For example, an object may be shown using a number of photographs taken from different angles and viewpoints. An audio narration discussing the object could be linked to this series of photographs. As another example, users may wish to include ambient audio recorded from the location the 3D environment represents. Instead of being linked to a particular image or set of images, the ambient audio may simply be repeated throughout the viewing experience.

In some embodiments, multiple people may work to create and/or edit a document in a collaborative way. For example, users may collaborate to tell a story of an event set in a particular location or to create a compelling advertisement for a shopping complex. Such a collaborative authoring process may be Wiki-like. There may be an overall owner of the document, but other users may edit it. A history of edits is preserved so that corrections may easily be made.

Figure 3:
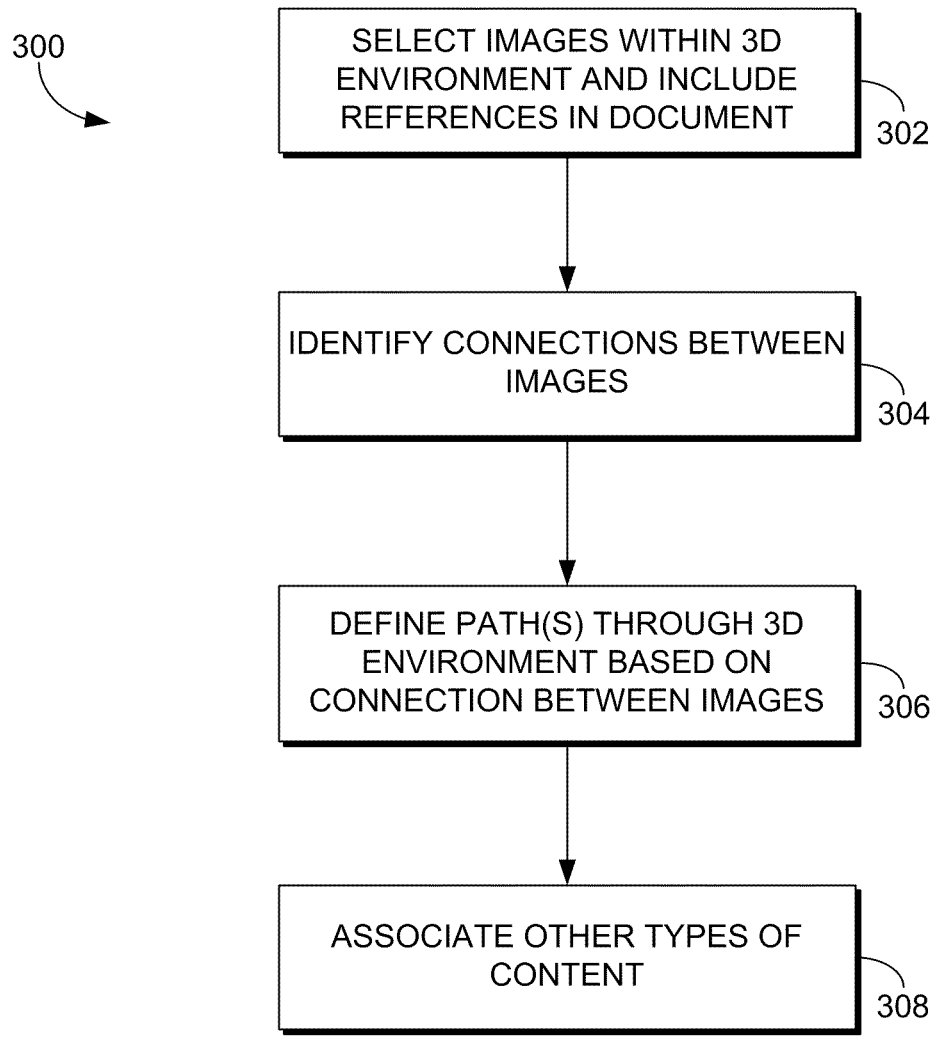
FIG. 3 is a flow diagram showing an exemplary method for creating a document defining connections between images in a 3D environment, in accordance with an embodiment of the present invention.

Turning to FIG. 3, a flow diagram is provided illustrating an exemplary method 300 for creating a document in accordance with an embodiment of the present invention. As shown at block 302, images within a 3D environment are selected and references to the images are included within the document. As indicated previously, a 3D environment may include too many images to provide a satisfying user experience. Accordingly, only a subset of the images may be selected for the document.

As shown at block 304, connections between images are identified. Typically, the connections are based on spatial relationships between images, such as images showing different perspectives of a common object or images that show adjacent objects within the 3D environment. In some cases, the connections may be based on other dimensions, such as subject, contents, time, and author.

One or more paths through the 3D environment are defined based on the connections between images, as shown at block 306. As indicated above, this may include a single, linear path through the 3D environment or may include a number of paths connected by one or more decision points.

Other types of content may also be associated with the document, as shown at block 308. These other types of content may include content added by users, for example, to tell a story, provide a tour, or to otherwise provide a richer experience. For example, the content may include annotations, audio narration, and ambient audio.

User Viewing Patterns

Information regarding user viewing patterns, such as how users navigate and view images within a 3D environment, may be useful to provide a more satisfying user experience. For instance, in an embodiment of the present invention, images within a 3D environment may be ranked based on user viewing information, such as the number of users who have viewed a particular image and/or how long users have viewed the image (i.e., a dwell time). By ranking images, images that are more representative, pleasing, and/or interesting to users may be identified. This is particularly useful when thousands or even millions of images may be available for a given 3D environment, causing clutter within the 3D environment. To reduce image clutter, higher ranking images may be selected for presentation, while lower ranking images may be removed. In some embodiments, to prevent a sort of self-fulfilling prophecy in which higher ranking images are arbitrarily maintained at a higher ranking due to their continued presentation, some lower ranking images may be selected and included for presentation. This provides an opportunity for lower ranking images (e.g., images that are newly added to the 3D environment) to establish a higher ranking. As a result, the system can accurately reflect what is trying to be measured, which is users' preferences. In addition to selecting images, image rankings may be used to automatically identify connections between images.

Figure 4:
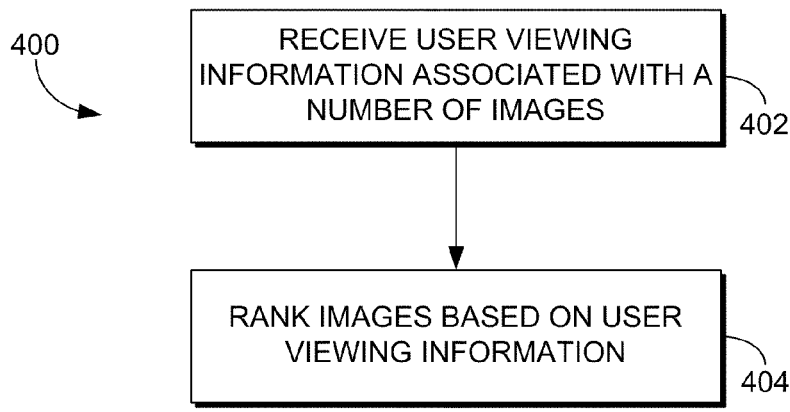
FIG. 4 is a flow diagram showing an exemplary method for ranking images, in accordance with an embodiment of the present invention.

Referring to FIG. 4, a flow diagram is provided showing an exemplary method 400 for ranking images in accordance with an embodiment of the present invention. As shown at block 402, user viewing information for a number of images is received. As indicated previously, the user viewing information for each image may include information such as the number of users who have viewed a particular image and the amount of time the image was viewed. As shown at block 404, the images may be ranked based on the user viewing information.

Image rankings may be particularly useful for the automatic creation and editing of documents described hereinabove. In particular, image rankings determined from user viewing patterns within a 3D environment may be used to generate a document by automatically selecting images and paths through the 3D environment. Additionally, image rankings may be determined for a particular document by analyzing user viewing patterns of the document. These image rankings may be used to further refine the document by identifying user preferences for images and paths.

In addition to user viewing information associated with each image, user navigational information may be collected for a 3D environment and used to provide a better user experience. The user navigational information may include information regarding paths taken by users through a 3D environment. As such, the user navigational information may allow for the automatic identification of connections between images, as well as the selection of paths through the 3D environment, for example, for automatically generating tours as described hereinabove.

Analysis of Image Spatial Density

In another embodiment of the present invention, the spatial density of images within a 3D environment may be analyzed and a variety of applications employing such spatial density information may be realized. In particular, the spatial density of images within a 3D environment provide information regarding what people are looking at in the real world that the 3D environment represents. Additionally, the spatial density of images provides information regarding the movement patterns of people through the real world. Accordingly, by analyzing the spatial density of images within a 3D environment, points of interest to users and paths traveled by users may be identified.

Figure 5:
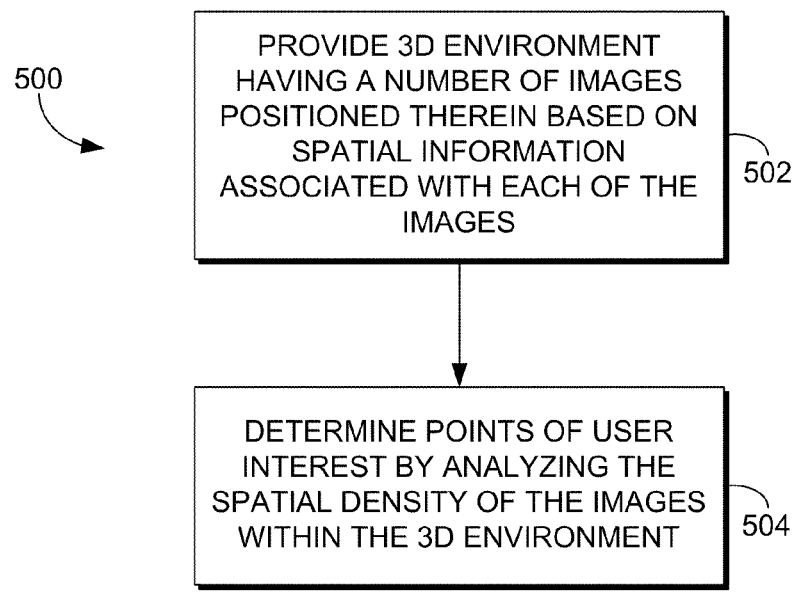
FIG. 5 is a flow diagram showing an exemplary method for determining points of user interest based on the spatial density of images positioned in a 3D environment.

A flow diagram showing an exemplary method 500 for using spatial density information to determine points of user interest is provided in FIG. 5. As shown at block 502, a 3D environment is provided having a plurality of images positioned therein based on spatial density information associated with each of the images. Points of interest are then determined by analyzing the spatial density of the images within the 3D environment, as shown at block 504.

One application of such spatial density information is to enhance user experiences within a 3D environment. For instance, spatial density information may be used to winnow down images to prevent excessive clutter that may result from an excessive number of available images for a particular 3D environment. Additionally, spatial density information may be used to automatically select paths through the 3D environment, for example, for the creation of tours through a 3D environment. This may provide more pleasing stories or tours and more immersive experiences.

A variety of real world applications may also be realized by employing spatial density information for images within a 3D representation. For example, spatial density information may be used to: determine placements of advertising in the real world; set advertisement pricing, rent amounts, and real estate pricing; build up advertising along often traveled routes, optimize pedestrian traffic planning, and to tailor real world tours. One skilled in the art will recognize that many other real world applications may be realized from spatial density information collected from a 3D representation of the real world in accordance with embodiments of the invention.

Navigating Between Images in Webpages and 3D Environments

In yet another embodiment of the invention, webpages may be seamlessly linked to points of interest in 3D space allowing users to navigate between webpages and 3D environments. In particular, users may "dive into" 3D environments from images on webpages. Conversely, users may "dive out of" 3D environments to webpages. Combining these aspects with the ability to navigate among different images in a 3D environment provides a new approach for users to navigate between webpages. For example, a user may "dive into" a 3D environment from an image in a first webpage. The user may then navigate to another image in the 3D environment, and use that image to "dive out of" the 3D environment to a second webpage containing that image.

Figure 6:
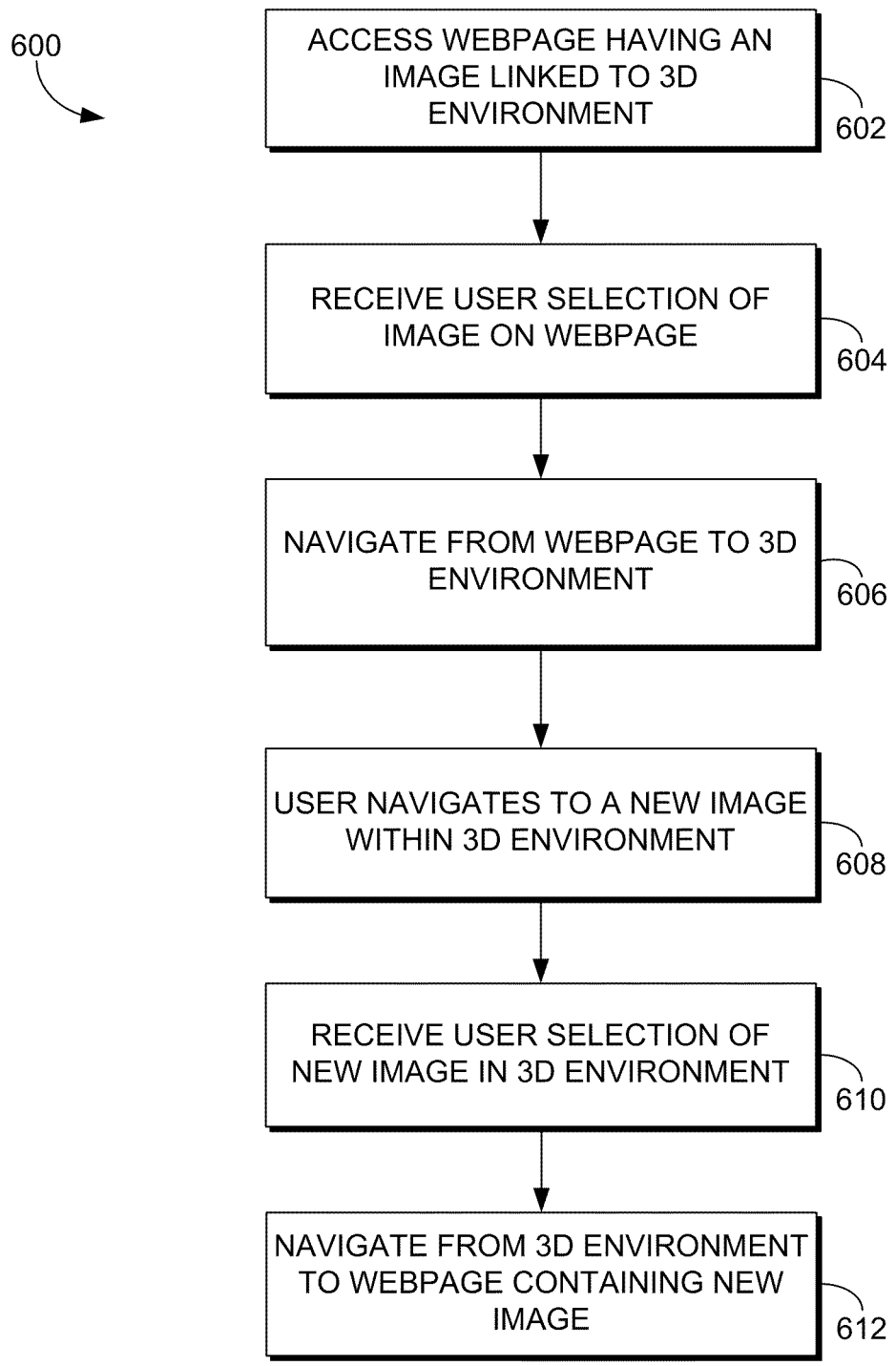
FIG. 6 is a flow diagram showing an exemplary method for navigating between images in webpages and 3D environments, in accordance with an embodiment of the present invention.

Referring to FIG. 6, a flow diagram is provided illustrating an exemplary method 600 for navigating between a webpage and a 3D environment in accordance with an embodiment of the present invention. FIG. 6 illustrates the concept of "diving into" a 3D environment from an image in a webpage, as well as "diving out of" the 3D environment to the same or another webpage. Initially, as shown at block 602, a user may access a webpage having an image. The image includes a hyperlink to a 3D environment, which includes that image, as well as other images, positioned within the 3D environment based on spatial information associated with each image. As shown at block 604, the user selects the image within the webpage. In response to the user selection, the user is navigated from the webpage to the 3D environment, as shown at block 606. In some embodiments, the 3D environment is presented from a position within the 3D environment based on the spatial information associated with the image that was in the webpage. In other words, the 3D environment is presented from the viewpoint of that image.

After "diving into" the 3D environment, the user may choose to navigate through the 3D environment and view other images. Some of the images within the 3D environment may include hyperlinks to webpages in which the images are located. As shown at block 608, the user navigates to a new image in the 3D environment. The new image includes a hyperlink to another webpage. As shown at block 610, the user selects the image in the 3D environment. By selecting the image, the user is navigated from the 3D environment to a webpage containing that new image, as shown at block 612.

By way of an example, a user may access a friend's webpage that includes a discussion of the friend's trip to Paris. The webpage may also include a number of photographs taken by the friend during the trip, including a photograph of the front of the Notre Dame cathedral. The photograph has been located within a 3D environment of the Notre Dame cathedral, such as that shown in FIG. 2B, and includes a hyperlink to that 3D environment. When the user selects the image, the user is navigated to the 3D environment, which is presented from the viewpoint of the photograph from the friend's webpage. The user may then choose to navigate through the 3D environment and view other images of the Notre Dame cathedral. Some of these images may have hyperlinks to webpages that contain the respective images. For instance, the user may navigate to an image, which comprises a close-up photograph of the central front door to the cathedral. The photograph may include a hyperlink to a tourism webpage that includes the photograph. By selecting the photograph, the user is navigated from the 3D environment to the tourism webpage.

Navigating between Aerial Imagery and 3D Environments

A variety of web sites, such as TerraServer, Virtual Earth, and Google Maps, are available that allow users to navigate aerial photographs. The websites allow users to view aerial photographs of different regions of the world, as well as to zoom between higher and lower level aerial images. However, users may be dissatisfied when the lowest level aerial photographs do not provide sufficient detail. In particular, users may also wish to view and navigate through street-level images.

Another embodiment of the invention provides an improved user experience by allowing users to navigate from aerial photographs to 3D environments that have been generated from and include 2D terrestrial images. Accordingly, users may be able to fly continuously from high level aerial photographs to a street-level experience. As a user navigates from high level aerial photographs to lower level aerial photographs, a level may be reached in which the user is seamlessly transitioned from an aerial photograph to a 3D environment containing a variety of 2D terrestrial images of the area. The user may then navigate through the 3D environment and also transition from the 3D terrestrial environment to the aerial photographs.

Interior Space 3D Environments

In addition to 3D environments for outdoor spaces and scenes, 3D environments of interior spaces may also be generated and navigated using 2D images of the interior spaces. Such 3D environments of interior spaces present a new form of virtual tours that may be provided for real estate, apartments, and businesses, such as restaurants, stores, and museums, for example. Allowing users to navigate through 3D environments of interior spaces using 2D images of the spaces presents a variety of possibilities, such as for selling real estate, advertising rental properties, or marketing a business.

Additionally, 3D environments of outdoor spaces may be connected directly with 3D environments of interior spaces. Images within a 3D environment of an outdoor space could be used as an entry point to a 3D environment for an interior space. As an example, a 3D environment could be generated of an area having a number of shops and restaurants. The 3D environment could allow a user to navigate through images of the area and select an image linked to a 3D environment of an interior of one of the shops or restaurants. The image could include a doorway to a restaurant, for example, that when selected transitions from the 3D environment for the outdoor space to the 3D environment for the restaurant. The user could then navigate through the 3D environment for the restaurant.

Facilitating Searching

There are numerous possibilities for linking geographic searches to 3D environments. Direct semantic connections among webpages can also be inferred when they include photographs taken from (or of) nearby locations; for both search and navigation purposes, this can be thought of almost as a hyperlink.

An additional implication is that photographs become the catalyst for creating semantic connections—something the Web has been trying to do for some years. This is not so surprising considering the density of information in an image. Although today images are mostly opaque, advances in object recognition/categorization in conjunction with this technology will unlock some of that data, while at the same time preserving connections between images.

The advent of searching as the primary means of navigating to a webpage altered the way content was authored (most infamously, with hidden keyword pages). Similarly, although many of the web-photo hybrid possibilities summarized above can be enabled in the browser without any special content authoring or change in the web ecosystem, new authoring modalities are likely to emerge, in which the "linkable" nature of images is exploited to create portals and connect environments.

Live Feeds and Real-Time/Near Real-Time Images

Live cell phone and web-cam images and video streams could also be integrated into 3D environments as live elements. Potential applications include live news gathering, reviewing concert footage from multiple vantage points, sharing wedding photos, enhancing the effectiveness of watchdog organizations such as World Watch, and empowering children in developing countries with cameras.

Creation of 3D Environments for 3D Objects

Another application of this technology is in the visual exploration of 3D objects, especially objects that might be of interest to collectors, aficionados, or for Web-based sales. Automatically building high-quality 3D models from images has proven to be a challenging problem that is not yet adequately solved. Photograph tours of objects in accordance with embodiments might bridge the gap between random collections of photographs and true 3D models with an experience that is intuitive and visually appealing.

CONCLUSION

As can be understood, embodiments of the present invention provide applications that extend the basic concept of generating 3D environments from 2D images and allowing user to navigate the 3D environments. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method being performed by one or more computing devices including at least one processor, for ranking images, the method comprising:
receiving user viewing information associated with each of a plurality of images of a geographically contiguous area, the plurality of images being a collection of photographs obtained from a variety of sources including at least one person, the geographically contiguous area representing a scene comprising adjacent objects or different perspectives of a common object in the real world, each of the images being automatically positioned in a three-dimensional (3D) environment based on spatial information corresponding to the geographically contiguous area and derived from each of the images, the 3D environment comprising a 3D model having been automatically generated from the plurality of images and representing a model of the real world scene; and
ranking at least a portion of the plurality of images based on the user viewing information associated with users viewing the images within the 3D environment to provide one or more image rankings.

2. The method of claim 1, wherein the user viewing information for an image includes information associated with at least one of the following: a number of users who have viewed the image; and a user dwell time for the image indicating how long a user has viewed the image.

3. The method of claim 1, further comprising controlling presentation of at least a subset of the plurality of images based on the one or more image rankings.

4. The method of claim 3, wherein controlling presentation of at least a subset of the plurality of images based on the one or more image rankings includes selecting a subset of higher ranking images for presentation and removing from presentation a subset of lower ranking images.

5. The method of claim 4, further comprising periodically selecting one or more images from the subset of lower ranking images for presentation.

6. The method of claim 1, further comprising automatically defining one or more connections between images based on the one or more image rankings.

7. The method of claim 1, further comprising receiving user navigation information associated with user navigations through the 3D environment.

8. The method of claim 7, wherein the user navigation information includes information regarding paths taken by users when navigating through the 3D environment, the paths representative of images users have viewed in the 3D environment and an order in which the images were viewed.

9. A computer-implemented method being performed by one or more computing devices including at least one processor, for using images to determine points of user interest, the method comprising:
providing a three-dimensional (3D) environment having a plurality of images of a geographically contiguous area in the real world, the plurality of images being a collection of photographs obtained from a variety of sources including at least one person, the geographically contiguous area representing a scene comprising adjacent objects or different perspectives of a common object in the real world, wherein the 3D environment comprises a 3D model that is automatically generated based on the plurality of images and represents a model of the real world scene, each of the images being automatically positioned in the 3D environment based on spatial information corresponding to the geographically contiguous area and derived from each of the images; and
determining points of user interest in the geographically contiguous area in the real world by analyzing the spatial density of the images within the 3D environment.

10. The method of claim 9, further comprising controlling the presentation of images based on the spatial density of the images within the 3D environment.

11. The method of claim 10, wherein controlling presentation of images based on the spatial density of the images within the 3D environment comprises selecting a first subset of images for presentation and removing from presentation a second subset of images.

12. The method of claim 9, further comprising determining connections between images based on the spatial density of the images within the 3D environment.

13. The method of claim 9, further comprising determining paths traveled by individuals in the geographically contiguous area in the real world by analyzing the spatial density of the images within the 3D environment.

14. One or more computing devices having at least one processor and one or more computer-readable media, the one or more computing devices comprising:

a three-dimensional (3D) environment generating component that generates a 3D environment from a plurality of images of a geographically contiguous area in the real world, the plurality of images being a collection of photographs obtained from a variety of sources including at least one person, the geographically contiguous area representing a scene comprising adjacent objects or different perspectives of a common object in the real world, the 3D environment comprising a 3D model representing a model of the real world scene generated from the plurality of images, wherein the 3D environment generating component positions each image of at least a portion of the plurality of images within the 3D environment based on spatial information corresponding to the geographically contiguous area and derived from each image to organize the photographs spatially and create transitions between them that preserve their geometric relationships; and an analysis component that analyzes information regarding images located within the 3D environment.

15. The one or more computing devices of claim 14, wherein the analysis component includes means for analyzing user viewing information associated with users viewing images within the 3D environment.

16. The one or more computing devices of claim 15, wherein the user viewing information for an image includes information associated with at least one of the following: a number of users who have viewed the image; and a user dwell time for the image indicating how long a user has viewed the image.

17. The one or more computing devices of claim 15, wherein the analysis component further comprises means for controlling presentation of at least a subset of the plurality of images based on the user viewing information.

18. The one or more computing devices of claim 14, wherein the analysis component includes means for analyzing spatial density information corresponding with the spatial density of images within the 3D environment.

19. The one or more computing devices of claim 18, wherein analyzing the spatial density information includes determining points of user interest in the geographically contiguous area in the real world by analyzing the spatial density of images within the 3D environment.

20. The one or more computing devices of claim 18, wherein analyzing the spatial density information includes determining paths traveled by individuals in the geographically contiguous area in the real world by analyzing the spatial density of images within the 3D environment.

\* \* \* \* \*